(12) United States Patent
Mutoh et al.

(10) Patent No.: US 6,351,072 B1
(45) Date of Patent: Feb. 26, 2002

(54) AUTOMOTIVE ILLUMINATING APPARATUS

(75) Inventors: Masanobu Mutoh, Seto; Hiroshi Sugihara, Ogaki; Goro Takahashi, Toyota, all of (JP)

(73) Assignee: Toyoda Gosei Co., Ltd., Nishikasugai-gun (JP)

( * ) Notice: Subject to any disclaimer, the term of this patent is extended or adjusted under 35 U.S.C. 154(b) by 0 days.

(21) Appl. No.: 09/638,391

(22) Filed: Aug. 15, 2000

(30) Foreign Application Priority Data

Sep. 30, 1999 (JP) .......................................... 11-277899

(51) Int. Cl.⁷ ................................................ B60Q 1/02
(52) U.S. Cl. ......................... 315/77; 340/441; 340/469
(58) Field of Search .................... 315/77, 82, 292–295, 315/DIG. 5, DIG. 4; 362/276, 802; 340/438, 463, 464, 469, 441

(56) References Cited

U.S. PATENT DOCUMENTS 5,831,389 A * 11/1998 Kawashima et al. .......... 315/77
6,133,827 A * 10/2000 Alvey et al. ................. 340/441

FOREIGN PATENT DOCUMENTS

| JP | 8-276786 | 10/1996 |
| JP | 9-301062 | 11/1997 |

* cited by examiner

*Primary Examiner*—Don Wong
*Assistant Examiner*—Wilson Lee
(74) *Attorney, Agent, or Firm*—Pillsbury Winthrop LLP

(57) ABSTRACT

A detection whether a vehicle is stopped or movable is executed, and based on the result, the light source is controlled to be in the first light emitting state when the vehicle is stopped while the light source is controlled to be in the second light emitting state when the vehicle is drivable.

12 Claims, 6 Drawing Sheets

AUTOMOTIVE ILLUMINATING APPARATUS

BACKGROUND OF THE INVENTION

1. Field of the Invention

The present invention relates to the automotive illuminating apparatus.

The present application is based on Japanese Patent Application No. Hei. 11-277899, which is incorporated herein by reference.

2. Description of the Related Art

A conventional automotive illuminating apparatus turns on and off a room lamp that is disposed approximately at the center of a ceiling in synchronism with on-off operations of an ignition key, opening-closing of doors or locking-unlocking of doors.

Even in a case wherein the room lamp that is disposed at the center of the ceiling is illuminated, not all parts in the vehicle room are illuminated sufficiently. Especially the areas under the beltline, such as inside door handles, door pockets, floor and central consoles, which cannot receive sufficient light from the illuminated courtesy lamp, are too dark for a driver and passengers to see clearly.

In Unexamined Japanese Patent Publication No. Sho. 62-255256, as a solution to this inconvenience, when a door is unlocked, the vicinity of an inside door handle for opening the door is locally illuminated for a predetermined duration of time.

Such a local illumination as described above improves convenience for the driver and the passengers to use the illuminated area. The local illumination, however, which is carried out in accordance with locking and unlocking of doors, is useless in the indoor areas of the vehicle other than the inside door handles.

Inventors of the present invention have researched further into the independent use of a partial illumination or a joint use with the room lamp. The research has revealed that the drivers' activities and purposes of the activities inside the stopped automobiles are different from those inside the travelling automobiles. That is, the drivers concentrate entirely on the driving operations while driving the automobiles, and thus any environment that disturbs their power of concentration should not be created inside of the vehicle room. On the other hand, since the drivers carry out some kind of operations, such as map reading and audio equipment adjustment, while the automobiles are being stopped, illumination is required to facilitate the operations.

The present invention is based on the above-described findings by the inventors themselves and the structure thereof is as follows:

An automotive illuminating apparatus for illuminating the interior of a vehicle room, which characteristically comprises:

means for detecting whether a vehicle is stopped or drivable, a light source, and control means for control of the light source, based on a result of detection by the detecting means, wherein the light source is controlled to be in the first light emitting state when the vehicle is stopped while the light source is controlled to be in the second light emitting state when the vehicle is drivable.

The illuminating apparatus of this structure enables different modes for the illuminated parts, respectively in the stopped state and the drivable state. Consequently, new vehicle room lamp designs are available. Especially when the vehicle is being driven or drivable, the light source is made comparatively dimmer to enhance the driver's power of concentration on the driving operations. On the other hand, when the vehicle is stopped, the light source is made comparatively brighter to enable efficient indoor operations.

Each element that constitutes the illuminating apparatus of this invention is described as follows. As described above, the illuminating apparatus of this invention is purposed to optimize the indoor environment for the driver and the passengers, and the vehicle where the illuminating apparatus of the invention is entirely applied is a passenger car. It should be duly understood that uses of this invention in the motortruck and the vehicles of other types are not limited. As a detecting means for detecting whether the vehicle is stopped or drivable, an embodiment herein uses a position sensor on the gearshift in an automatic transmission vehicle. The vehicle is recognized as being stopped when the gearshift is in the parking position and recognized as being drivable when in the other positions. The vehicle may be recognized as being stopped when the gearshift is in the neutral position.

It a case of manually operated transmission gearshift vehicle, the vehicle is recognized as being stopping when the gearshift is in the neutral position. When the gearshift is in the other positions, the vehicle is recognized as drivable. Whether the vehicle is stopped or drivable is also recognized from a state of the parking brake. When the parking brake is engaged (or being pulled up), the vehicle is stopped and, when the parking brake is released, the vehicle is drivable. Whether the vehicle is stopped or drivable is also recognized from a state of the accelerator. When the accelerator is released (or not being stepped on), the vehicle is stopped and, when the accelerator is stepped on, the vehicle is drivable.

Furthermore, whether the vehicle is stopped or drivable is also recognized by detection of actual vehicle speeds. An existing speedometer is utilized for detection of the actual vehicle speeds.

As a light source, an LED, besides the electric valve, can be used in the same way as in conventional uses.

The light source illuminates the areas below the beltline in the vehicle room. The areas illuminated by the light source include the inside door handles, door pockets, scuff plates, passengers' foot areas, central consoles, and coin- and card-pockets.

There is no particular limitation to installation positions of the light source. Each of the illuminated part may be equipped with a light source, or a single light source may be used for illumination of a plurality of parts.

The light source is controlled to be in either the first light emitting state (when the vehicle is stopped) or the second light emitting state (when the vehicle is drivable). The second light emitting state may be dimmer than the first light emitting state so that the driver can concentrate on the driving operations. In the embodiment, the output of the light source in the second light emitting state is approximately 95% of the first light emitting state. As a result, when the vehicle is in a travelling state after the concerned part has been brightly illuminated in the stopped vehicle state, the illuminated part is maintained with visual legibility but the reduced brightness enhances concentration on the driving operations.

The light source can be completely dimmed out in the second light emitting state. In this case, a gradual transfer (a fading out) from the illuminated state (the first light emitting state) to the extinguished state (the second light emitting state) is also possible. In the same way, a gradual transfer (a fading in) from the extinguished state (the second light emitting state) to the illuminated state (the first light emitting state) is also possible. Thus, the gradual change in the illuminated state enables new effects on the illumination design in the vehicle room.

Features and advantages of the invention will be evident from the following detailed description of the preferred embodiments described in conjunction with the attached drawings.

DETAILED DESCRIPTION OF THE PREFERRED EMBODIMENTS

Figure 1:
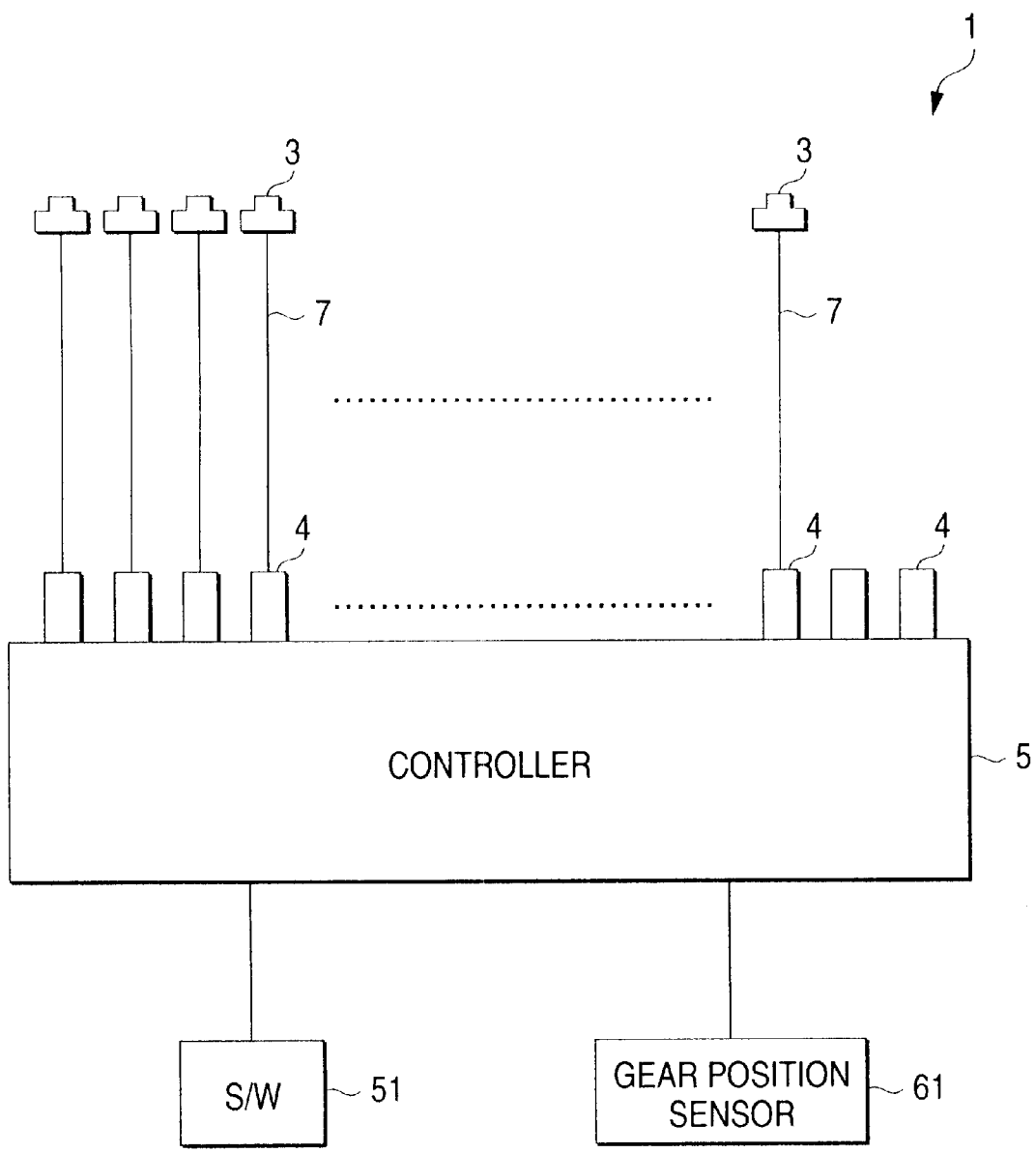
FIG. 1 is an outlined block diagram of the illuminating apparatus of the embodiment of this invention.
Figure 2:
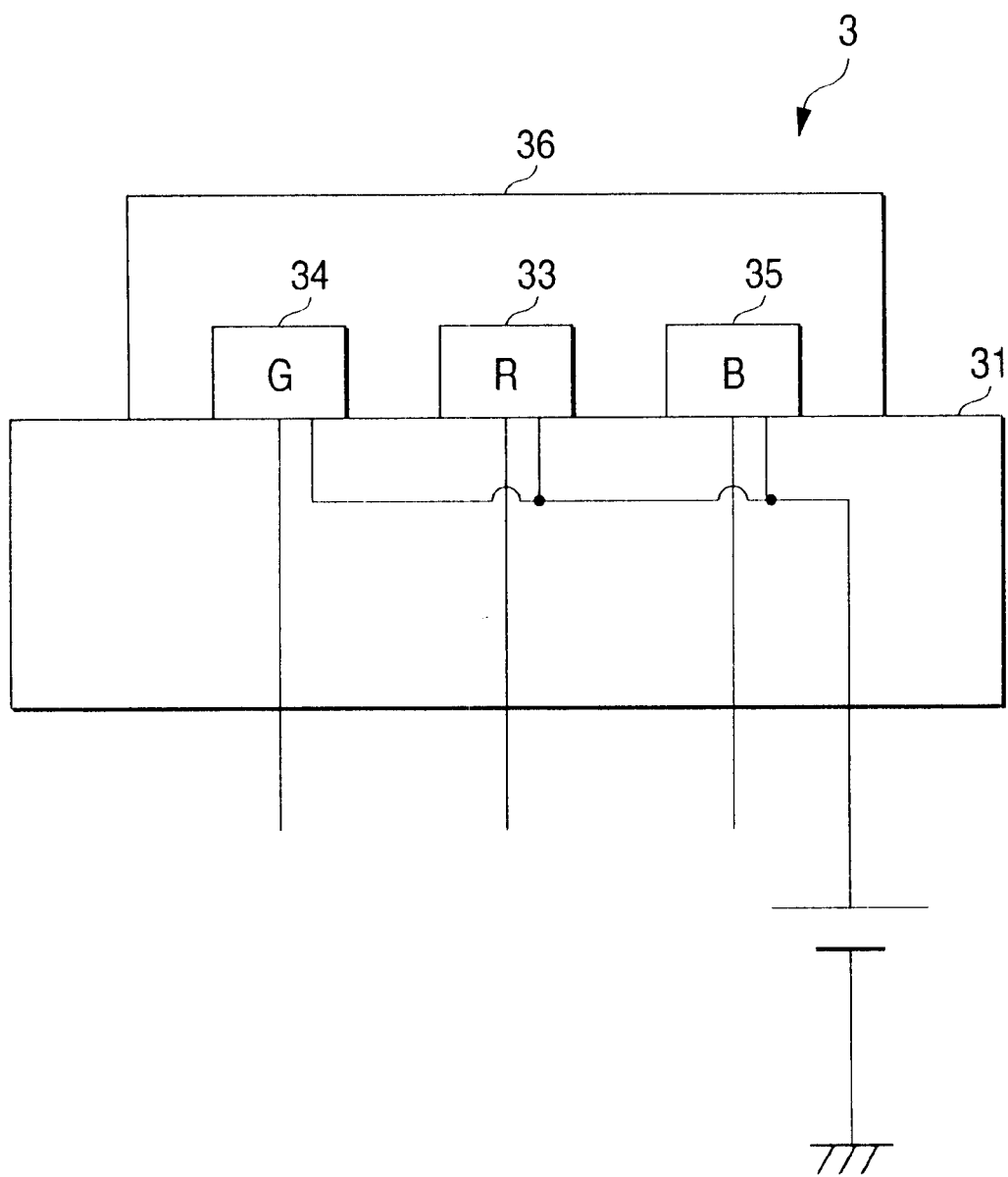
FIG. 2 is a sectional view to show the structure of the LED light source.

An embodiment of this invention is described now. FIG. 1 shows the approximate structure of illuminating apparatus 1 according to this invention. The illuminating apparatus 1 has a plurality of LED light sources 3, a controller 5 and a gear position sensor 61. The plurality of LED light sources 3 are included to illuminates a plurality of parts, such as inside door handles and door pockets and, as shown in FIG. 2, each of the LED light sources 3 includes a red LED 33 that is disposed approximately at the center of a circuit board 31 with a green LED 34 and a blue LED 35 on either side thereof. The LEDs 33 through 35 are covered with transparent resin 36.

Figure 3:
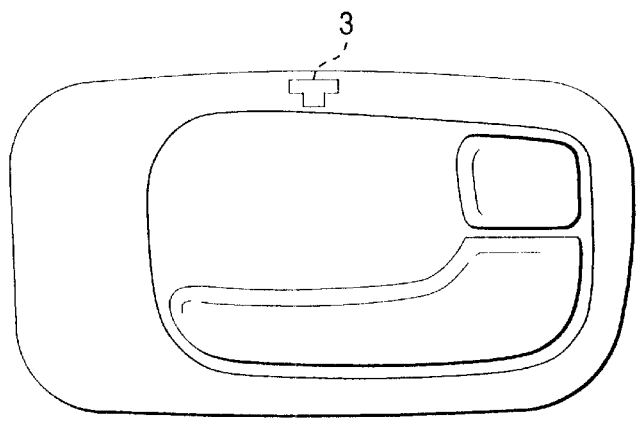
FIG. 3 shows a layout of the LED light source for an inside door handle.

The LED light source 3 is disposed in the vicinity of the inside door handle, for instance, so as to illuminate this dimly, as shown in FIG. 3. In a sedan type passenger car of this embodiment, a total of twenty-one LED light sources 3 are used to respectively illuminate four door handles on the doors, four door pockets, four assistance grips, four scuff plates at the steps, four foot areas of the driver and passengers and one upper console panel. It should be duly understood that the number of parts illuminated by the light sources 3 and the number of LED light sources 3 are not limited to this but can be designed freely.

For this reason, a total of twenty-three connection ports 4 are provided on the controller 5 of the embodiment, and two connection ports, 4 are left unused. Therefore, the illuminating apparatus of this embodiment has such flexibility of design for addition of two more LED sources.

Figure 4:
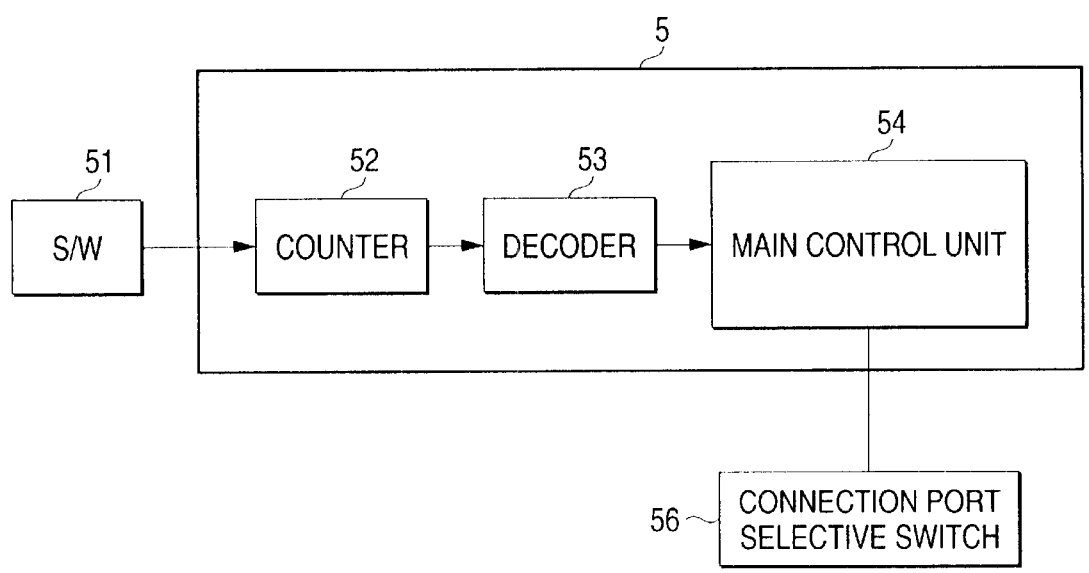
FIG. 4 shows the structure of the controller.
Figure 5:
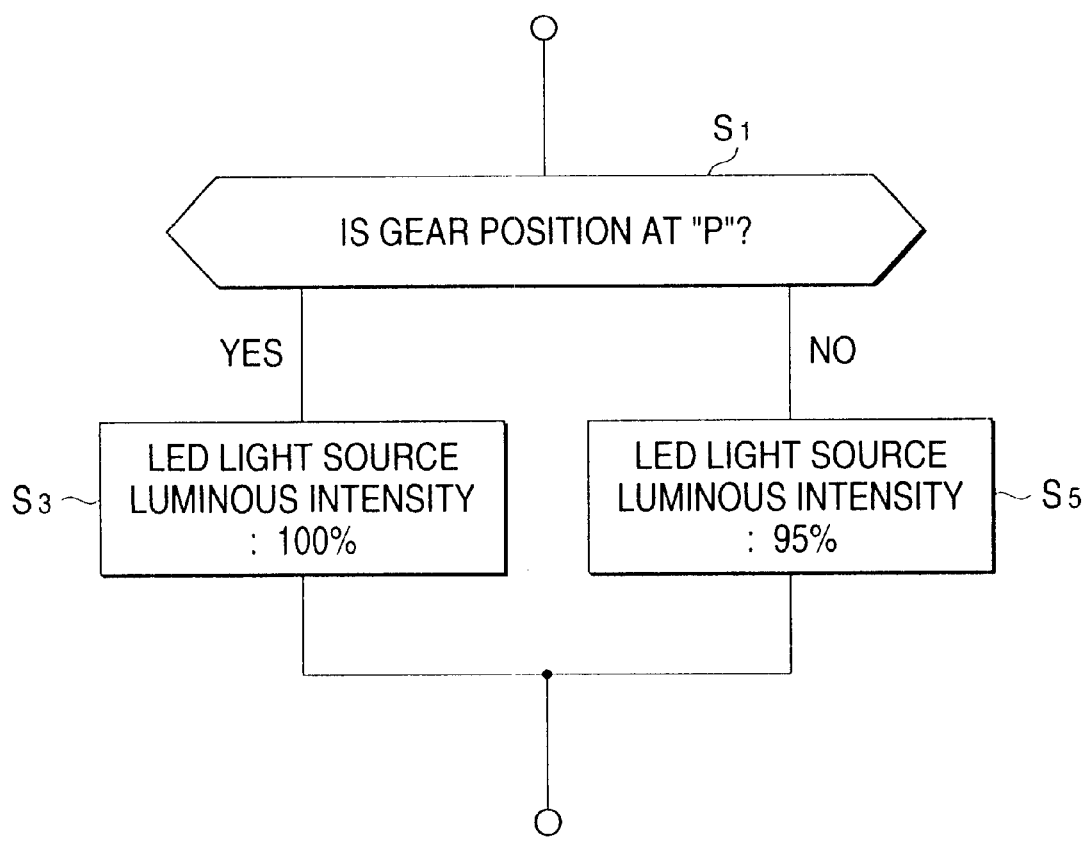
FIG. 5 is a flowchart to illustrate the operations of the illuminating apparatus of the embodiment of this invention.

The LED light source 3 can be illuminated in desired colors when the LEDs 33, 34 and 35 that constitute the LED light source 3 are controlled respectively. For this reason, the controller 5 has a structure that is shown in FIG. 4. The driver or passengers can select one color from those prepared beforehand (for instance, seven colors) by operating a switch 51. When the switch 51 is operated, the count rate at a counter 52 on a control circuit 5 changes in such manner as 1⇔2⇔3⇔⇔4⇔5⇔6⇔7, for instance. The count rates at the counter 52, which correspond to colors predetermined at a decoder 53 (for instance, "Blue", "blue-green", "Green", "White", "Yellow", "Orange", and "Red"), are sent to a main control unit 54. The main control unit 54 controls the LEDs 33, 34 and 35 in the LED light source 3 respectively so as to produce the predetermined color.

As described above, the controller 5 is provided with twenty-three connection ports 4 (all in the same structure), and twenty-one connection ports among these are connected to the wiring 7, so that the LED light sources 3 are controlled respectively. The connection ports 4 which are connected to the wiring 7 are selected and made active by a connection port selective switch 56 that has such a structure as of dip switches. The connection port selective switch is operated before the illuminating apparatus 1 is attached to the vehicle.

In this embodiment, the same signal is transmitted to each connection port 4 and, thus, each LED light source 3 is in the same light emission mode (color and luminous intensity). It should be understood that different light emission modes are also available so as to much the locations of the LED light sources 3 through individual adjustment of the signals that are transmitted to the connection ports 4.

Wiring 7 is stored in the harness in the same way as wiring for other electrical equipment. A connector that is connectable to the connection port 4 is attached to the controller side of each wiring 7. Since all the connection ports 4 have the same structure, the concerned connectors also have the same structure. This realizes common use of the parts.

The gear position sensor 61 detects whether the position of gearshift of the automatic transmission car is at the parking position. The output of the general circuit for display of the gearshift position on the front panel can be used for the detection as it is.

The operations of the illuminating apparatus 1 of the embodiment are described now. Whether the gearshift position or the gear potion is at the parking position (P) or the rest (N, R, D, 2, 3, and such) is detected at step 1. When the gear position is at the parking position (P), the controller 5 of illuminating apparatus 1 transmits the signal to each connection port 4 so that each LED light source 3 may emit light by outputting 100% of the ratings (step 3). The signal is impressed to each LED light source 3 via the wiring 7 and, accordingly, each LED light source 3 emits light by outputting 100% of the ratings.

When the gear position is not at the parking position (P), the controller 5 of illuminating apparatus 1 transmits the signal to each connection port 4 so that each LED light source 3 may emit light by outputting 95% of the ratings (step 5). The signal is impressed to each LED light source 3 via the wiring 7 and, accordingly, each LED light source 3 emits light by outputting 95% of the ratings.

Since the vehicle is stopped when the gear position is at the parking position (P), the vehicle is stopped and thus it is desirable that the interior is illuminated as bright as possible; whereas the vehicle is drivable when the gear position is not at the parking position (P), it is desirable that the interior is illuminated somewhat dimly so that the driver can concentrate on the driving operations. The operativeness, however, improves because parts that need to be operated while driving are dimly illuminated.

Although, in this embodiment, the output of the LED light source is adjusted in synchronism with gear position, the color may be varied. Moreover, it is possible to control the LED light source 3 so as to be extinguished, when the parking position (P) is not selected.

Figure 6:
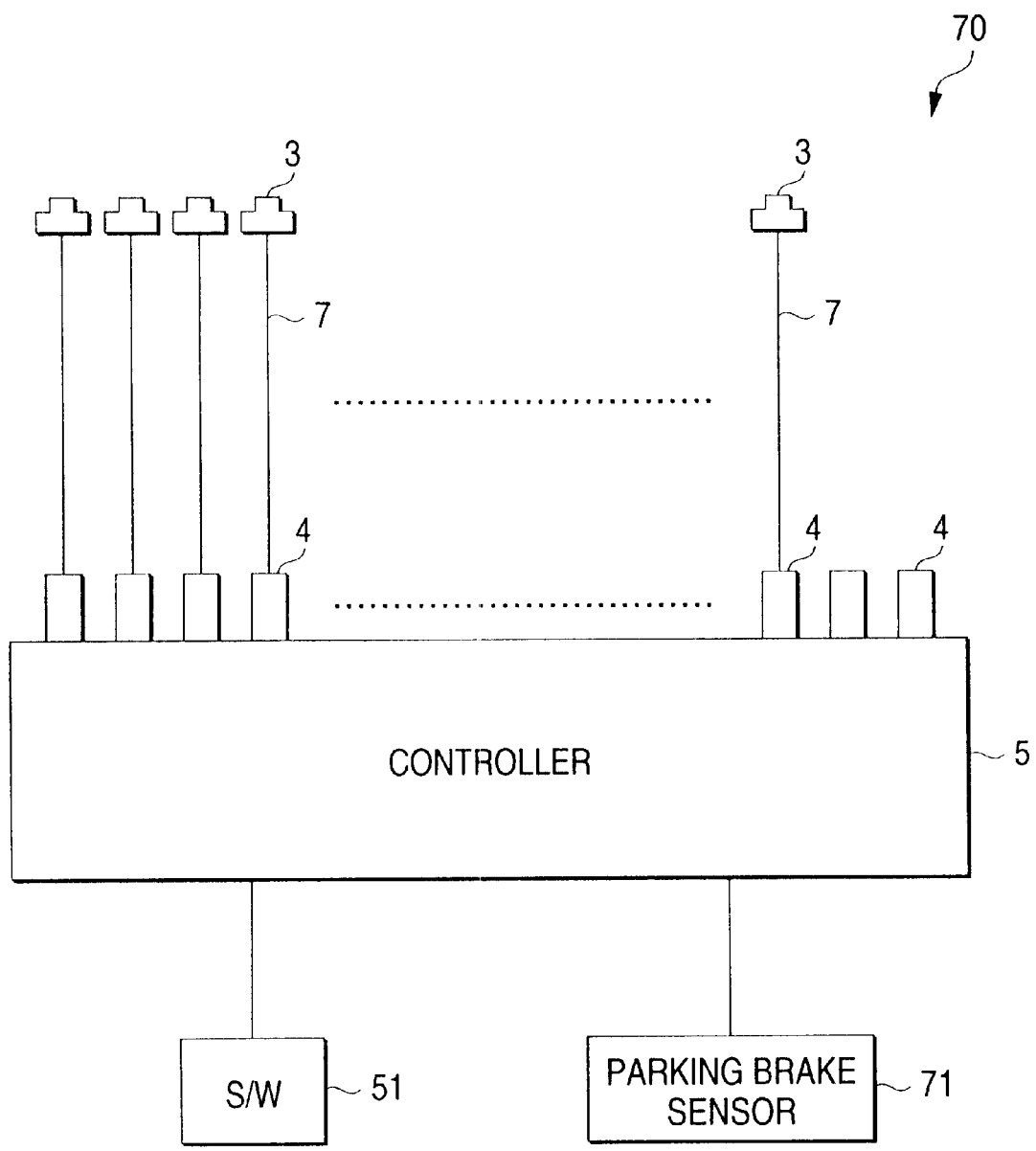
FIG. 6 is an outlined block diagram of the illuminating apparatus of an alternative embodiment of this invention.
Figure 7:
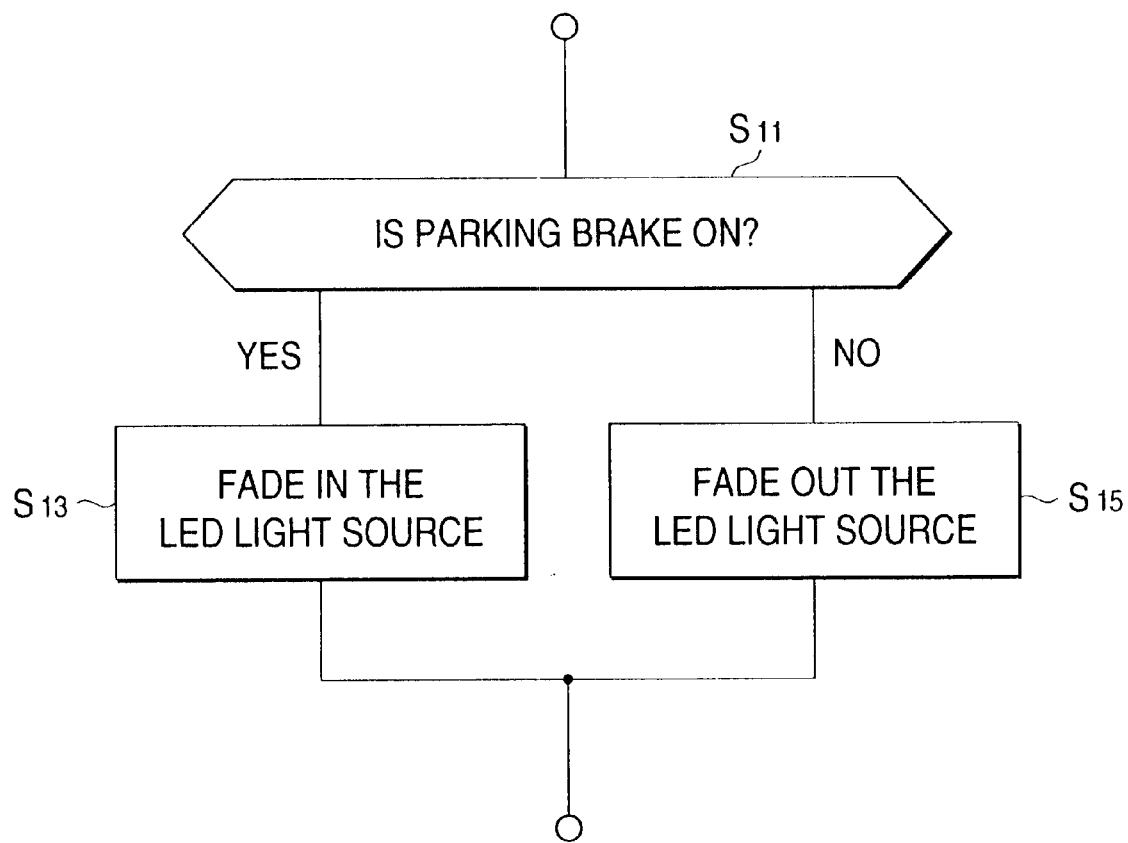
FIG. 7 is a flowchart to illustrate the operations of the illuminating apparatus of the alternative embodiment.

An illuminating apparatus 70 as an alternative embodiment is described now with references to FIGS. 6 and 7. The same symbols are given to the same elements as in FIG. 1 to eliminate the explanation.

In this embodiment, a parking brake sensor 71, is used as means to detect whether the vehicle is stopped or drivable. The sensor 71 detects whether the parking brake is pulled up (the on state) or released (the off state), and the output of a general circuit by which the parking brake synchronizes the on-off operations of the automotive TV display to the on-off operations of the parking brake may be used for the detection as it is.

The operations of the illuminating apparatus 70 of this embodiment is described hereunder (Refer to FIG. 7). Whether the parking brake is pulled up (the on state) or released is detected at step 11. When the parking brake is in the on state, the controller 5 of the illuminating apparatus 70 transmits the signal to each connection port 4 so as to fade-in each of the LED light sources 3 (step 13). This signal is impressed to each of the LED light sources 3 via the wiring 7 and, as a result, the LED light sources 3 fade in and emit lights, outputting 100% of the ratings until the parking brake is released.

When the parking brake is released, the controller 5 of the illuminating apparatus 70 transmits the signal to each of the connection ports 4 so as to fade out the LED light sources 3 (step 15). The signal is impressed to each of the LED light sources 3 via the wiring 7 and, as a result, the LED light sources 3 fade out and are maintained in the extinguished state until the parking brake is pulled up again.

This invention is not confined by any of the modes of the above-described embodiments of the invention and the explanation of the embodiments. This invention includes a variety of modifications that do not deviate from the description within the scope of the claims for patent and within the range of simple imagination of these inventors.

What is claimed is:

1. An automotive illuminating apparatus for illuminating interior of a vehicle room, comprising:

a detecting device for determining whether a vehicle is stopped or drivable;

a light source; and a controller for control of said light source based on a result of detection by said detecting device, wherein said light source is controlled by said controller to be in a first light emitting state when the vehicle is stopped while said light source is controlled to be in a second light emitting state when said vehicle is drivable.

2. An automotive illuminating apparatus according to claim 1, wherein said light source illuminates areas under a beltline inside the vehicle room.

3. An automotive illuminating apparatus according to claim 1, wherein said second light emitting state is dimmer than said first light emitting state.

4. An automotive illuminating apparatus according to claim 3, wherein brightness in said second light emitting state is approximately 95% of brightness in said first light emitting state.

5. An automotive illuminating apparatus according to claim 1, wherein a change from said first light emitting state to said second light emitting state and a change from said second light emitting state to said first light emitting state are carried out gradually.

6. An automotive illuminating apparatus according to claim 1, wherein said detecting device detects whether said vehicle is stopped or drivable with reference to a gearshift position.

7. An automotive illuminating apparatus according to claim 6, wherein, when said gearshift is set to a parking position, said detecting device detects that said vehicle is stopped.

8. An automotive illuminating apparatus according to claim 1, wherein said detecting device detects whether said vehicle is stopped or drivable with reference to a parking brake state.

9. An automotive illuminating apparatus according to claim 1, wherein said detecting device detects whether said vehicle is stopped or drivable with reference to an accelerator state.

10. An automotive illuminating apparatus according to claim 1, wherein said detecting device detects whether said vehicle is stopped or drivable with reference to a vehicle speed.

11. An automotive illuminating apparatus for illuminating interior of a vehicle room, comprising:

a detecting device for determining whether a gearshift is set to a parking position;

a light source illuminates areas under a beltline inside said vehicle room; and a controller for control of said light source based on a result of detection by said detecting means, wherein said light source is controlled to be in a first light emitting state when said gearshift is set to a parking position while said light source is controlled to be in a second light emitting state, which is dimmer than said first light emitting state, when said gearshift is set to any position other than a parking position.

12. An automotive illuminating apparatus according to claim 11, wherein said light source fades out when said gearshift is set from a parking position to another position while said light source fades in when said gearshift is set from any position other than parking position to a parking position.

* * * * *